United States Patent [19]

Qureshi et al.

[11] Patent Number: 4,621,399

[45] Date of Patent: Nov. 11, 1986

[54] TUBE-COATING METHOD AND APPARATUS THEREFOR

[75] Inventors: Gulzar A. Qureshi, Tinley Park; Daniel P. Morrison, Hazel Crest; Humberto A. Hijuelos, East Hazel Crest; Lawrence P. Vollmuth, Wheaton, all of Ill.

[73] Assignee: Allied Tube & Conduit Corporation, Harvey, Ill.

[21] Appl. No.: 810,917

[22] Filed: Dec. 18, 1985

[51] Int. Cl.[4] .......................... B21B 15/00; B23K 1/20

[52] U.S. Cl. ...................................... 29/33 D; 29/460; 29/527.4; 72/46; 72/51

[58] Field of Search ................. 29/33 D, 527.2, 527.4, 29/460; 72/46, 51, 368; 228/146, 147, 150, 151, 17.5

[56] References Cited

U.S. PATENT DOCUMENTS

| | | | |
|---|---|---|---|
| 3,559,280 | 2/1971 | Mailhiot et al. | 29/527.4 |
| 3,616,983 | 11/1971 | Kamimura et al. | 228/5 |
| 3,667,095 | 6/1972 | Ostrowski | 29/33 D |
| 3,965,551 | 6/1976 | Ostrowski | 29/33 D |
| 4,441,238 | 4/1984 | Hijuelos et al. | 29/33 D |

OTHER PUBLICATIONS

"Use of Non-Metallic Pearlescent Pigments to Achieve Metallic Appearance", C. J. Rieger, The Mearl Corporation, May 9, 1979.

*Primary Examiner*—E. Michael Combs
*Attorney, Agent, or Firm*—Fitch, Even, Tabin & Flannery

[57] ABSTRACT

An in-line, continuous, roll-forming tube mill production line. The line includes a supply station for continuously supplying steel strip, a roll-forming station for forming the strip into a tubular configuration, and a welding station for joining by welding the edges of the strip. The line also has at least one station for performing a process which calls for the application of a liquid to the exterior of the tubing such as cleaning, rinsing or applying a coating. A preheating station is provided for preheating of the tubing by induction and a powder coating station applies a plastic coating or a metallically pigmented plastic coating to the exterior of the tubing, the powder coating station having a chamber and means for selectively isolating the tubing from chamber. Finally, the tube mill production line includes a heating station for baking and/or curing of the powder coating. An improved method of forming and coating tubing using a continuous, in-line, roll-forming tube mill production line is also disclosed.

11 Claims, 5 Drawing Figures

TUBE-COATING METHOD AND APPARATUS THEREFOR

The present invention relates to the continuous forming and coating of tubing and, more particularly, to forming steel tubing from strip stock and providing a thin uniform plastic coating with decorative pigmentation on the exterior of the tubing, using an improved tube mill production line.

BACKGROUND OF THE INVENTION

It is well known to produce endless lengths of welded steel tubing from strip stock and to continuously galvanize that tubing by providing a zinc coating on the exterior surface as taught, for example, in U.S. Pat. Nos. 3,122,114 and 3,230,615 which are owned by the assignee of this patent application. It is likewise known to continuously apply polymeric coatings to the exterior of such continuously formed tubing, employing various thermoplastic and thermosetting resins, as for example taught in U.S. Pat. Nos. 3,559,280; 3,616,983; 3,667,095 and 3,965,551.

A preferred method of providing the plastic coating on the exterior of the tubing is by passing the formed tubing through a preheating station and then through a powder coating station having a chamber including a particulate fluidized bed of thermoplastic particles or a spray chamber. The coating station is part of an in-line, continuous roll-forming tube mill production line including upstream stations where the steel strip is formed into a tubular configuration and the edges thereof welding together by, for example, an induction welder. The tube mill also includes one or more other stations disposed between the welder and the powder coating station where liquid is applied to the exterior of the tubing. Liquids may be applied for washing and or pickling, rinsing or applying a coating.

Because of the many complicated components which make up the tube mill, the limited service life of certain components and the high speed at which the tubing is produced, the mill must be shutdown not only periodically for component servicing and replacement, but also in the case of a serious malfunction at any one of the stations. The tube mill includes various heaters, dryers and wipers for preventing liquid applied at one of the upstream stations from being carried by the tubing into the coating chamber where the liquid would contaminate the fluidized bed. However, during emergency shutdown situations and during start-up when scrap tubing is generated, the various liquid removal stations may not still (or yet) be operating effectively resulting in potential liquid contamination of the powder coating accumulated in the spray chamber booth due to overspray. If substantial liquid does enter the spray booth, time-consuming clean up of the powder coating station might be required resulting in significant downtime for the production line and loss of production and the cost of the contaminated particulate material.

SUMMARY OF THE INVENTION

Among the various aspects and features of the present invention may be noted the provision of an improved continuous roll-forming tube mill production line. The line includes selectively operable means for isolating the tubing from the spray booth to prevent liquid carried by the tubing from contaminating the spray booth. One or more sensors may be provided to detect a malfunction at one of the stations upstream from the powder coating station, or a manual switch may be used, to control operation of the isolation means which functions to direct liquid carried by the tubing away from the chamber. The isolation means also is used to isolate the tubing from the chamber until start-up of the tube mill is completed. The powder coating station applies a thin, uniform coating which may include flakes of metallic material and/or pearlescent material. The isolation means embodying various features of the present invention is reliable in use, has long service life and is relatively easy and economical to manufacture. Other aspects and features of the present invention will be, in part, apparent and, in part, specifically pointed out in the following specification and accompanying claims and drawings.

Briefly, the improved tube mill production line embodying various features of the present invention includes a supply station for continuously supplying steel strip, a roll-forming station for forming the strip into a tubular configuration, and a welding station for joining by welding the edges of the strip. The mill further includes at least one station for performing a process calling for the application of a liquid to the exterior of the tubing. The mill also has a preheating station, and a powder coating station for applying a plastic coating to the exterior of the tubing, the powder coating station including a spray booth and means for isolating the tubing from the chamber. The mill also includes a heating station for baking and/or curing of the powder coating.

BRIEF DESCRIPTION OF THE DRAWINGS

Corresponding reference characters indicate corresponding components throughout the several views of the drawings.

DESCRIPTION OF THE PREFERRED EMBODIMENT

Figure 1:
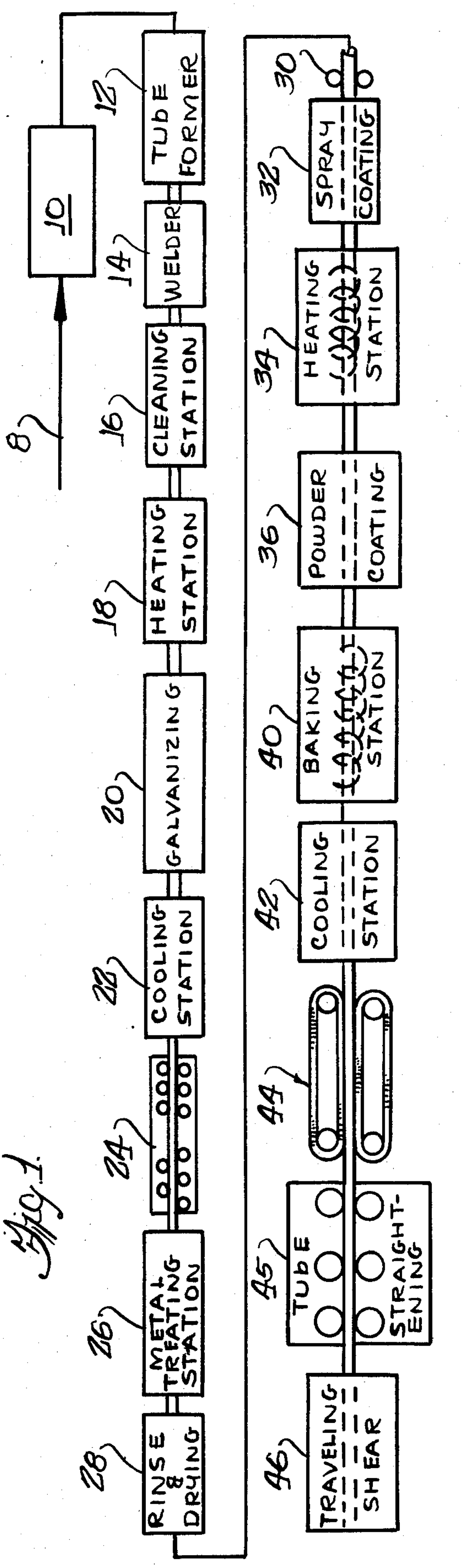
FIG. 1 is a diagrammatic illustration, in block form, of an in-line, continuous, roll-forming tube mill production line, including a powder coating station, embodying various features of the present invention.

A preferred embodiment of an in-line, continuous, roll-forming tubing mill production line embodying various features of the invention is illustrated in FIG. 1 wherein certain stations are shown only diagrammatically, particularly the upstream portion of the production line wherein the continuous forming, welding and galvanizing occurs. A more detailed description of these various stations is found in the aforementioned patents.

Although the overall production line is illustrated as including a galvanizing station, as well as a station where a primer coating can be applied, in its broadest aspects, the invention is considered to be valuable whether or not the formed and welded tubing is first galvanized, and the use of the primer coating station is clearly optional. Although the term "galvanizing" is used, this term is employed in its broadest sense and is not intended to be restricted to the employment of pure zinc as, for example, an alloy of zinc with aluminum could be used.

The overall apparatus of FIG. 1 depicts a production line in which each of the stations is considered to be treating steel strip moving from right to left. At the upper righthand corner, strip 8 is shown which is being supplied from a suitable roll source (not shown). The strip travels past an end welder, known in the art for splicing an end of one roll to another roll at the required time, and enters an accumulator 10 wherein a sufficient length of strip is stored to supplv the line while adjacent ends are being welded. Likewise, the edges of the strip may be appropriately treated so as to be ready for welding at the time that the strip 8 enters a tube former 12. The tube former 12 is constituted by a series of conventional forming rolls whereby the strip is continuously deformed from its initial flat character to that of a rounded tube with the edges of the strip in approximately abutting relation to form the seam of the tube upon welding.

The continuous tubular form created by the tubeformer 12 advances directly to a welder 14 where the edges of the strip are joined by welding, preferably using an induction welder. After the welding is complete and scarfing of the outer surface in the welded region is effected, the tubing is passed to a washing and pickling station 16 where cleaning and removal of oxides occur. This station may include an alkali wash for removing grease from the surface of the tubing, followed by rinsing and then acid treatment for pickling the surface, followed by a further rinse, all of which are well known in the prior art and described in the earlier-mentioned patents.

Following the cleaning station 16, the tubing passes to a first station 18 which is located prior to a galvanizing bath 20 and which preferably utilizes induction heating, although other types of heating can be employed to bring the tubing up to the desired temperature prior to its entry into the galvanizing bath 20. In order to guard against oxidation of the cleaned tubing, an inert or nonoxidizing atmosphere, for example, nitrogen, is used to surround the tubing from the time at which its enters the heating station 18 until it passes into the zinc bath. The details of preferred embodiments with respect to providing such an atmosphere are set forth in the aforementioned patents.

In the heating station, the tubing is preferably preheated to a temperature above the melting point of the galvanizing material, and as a result, the continuously moving heated tubing picks up a uniform coating of zinc or zinc alloy as it passes through the bath. Appropriate wiping is effected at the exit from the zinc bath, and the galvanized tubing proceeds immediately to a cooling station 22, which may be a water-filled quench tank. After cooling to the desired temperature is effected, the galvanized tubing next enters a sizing and straightening station 24.

Following straightening, an optional metal-treating station 26 is provided wherein the galvanized tubing is treated by chromating, phosphating or the like. By treating the galvanized surface with a chromate and nitric acid solution, a zinc chromate outer film is created which provides even greater resistance to oxidation. If such a metal treating station 26 is provided, a rinse and an air dryer station 28 is included immediately thereafter.

In this upstream region of the production line, there is ample opportunity to support the tubing against sagging as a result of gravity, and of course the sizing and straightening rolls provide such support as well as drive the tubing longitudinally. However, the final support 30 for the tubing downstream of the metal treating station 26 until it reaches the take-off assist device is located just past the drying station 28. The support rollers 30 assure both vertical and horizontal alignment of the tubing of the location.

Just downstream of this point of last support, the tubing enters a liquid spraying station 32 where a coating, in liquid form, can be applied, as for example by a plurality of atomizing spray heads. The station 32 is designed to provide a primer coating prior to applying a thicker polymeric coating in powder form at a downstream location, and it is generally used in instances wherein the galvanizing and chromating or phosphating steps are omitted, so that such primer coating is applied upon the cleaned surface of the welded tubing.

The tubing next proceeds to an induction heating station 34 which preheats the tubing prior to its entry into the powder coating station 36 which is next in line. However, whenever a liquid coating is applied to the tubing, the induction heating station 34 serves to dry the coating by removing the remainder of the solvent and to also cure any resin which might be included therein.

Under the usual conditions, the primary function of the heating station 34 is to raise the temperature of the tubing to that desired for the powder-coating application. This temperature will vary with the particular powder composition being used; however, it will generally be in the range from about 120° F. to about 400° F. Because the tubing will usually already have been either galvanized or coated with a primer, it is not felt necessary to provide a nonoxidizing atmosphere at the induction heating station 34, and in any event, the temperature will usually not be as high as that employed in the heating station 18 just prior to galvanizing. It will generally be between about 120° F. and about 140° F. for nylon coated tubing.

The powder coating may be applied in any manner suitable for treating a fast-moving article, for example, electrostatic spray, or by an electrostatic-fluidized bed process, all of which are known in the prior art. The employment of such powder-coating processes for coating pipe is shown in U.S. Pat. No. 3,616,983. The powder composition will be a plastic material and may include pigments, plasticizers and the like. Both thermoplastic and thermosetting resins may be employed, as for example, polyamides, polyvinylchlorides, polyesters, polyvinylidene chlorides, polyvinylacetates, butyrates, polyolefins, acrylics, epoxys, as well as blends of the foregoing.

It is considered important that it be possible to closely control the thickness of the coating which is applied in this powder-coating operation, and polymeric coating thicknesses between about 1.0 mil and about 10 mils can be applied uniformly by such powder-coating arrangements at the speeds of operation at which it is desired to run the tubing mill. For example, when nylon coatings are employed, they are usually used at a normal thickness of about 4 mils. It is feasible to produce nylon-coated tubing of this type, ranging from about 0.5 inches to 3.0 inches in outer diameter, wherein the thickness of the nylon coating will uniformly be not less than 2 mils and not more than 5 mils, at high production-line speeds, i.e., about 400 feet per minute or higher.

Immediately following the powder coating station, the tubing enters a further heating station 40, preferably containing one or more induction heating units, where fusing and/or curing of the powder coating takes place. The heating pattern is determined by the specific resin coating composition that is being used, because different heating criteria are employed to obtain the optimum melt-flow of the polymeric coating. A temperature range from about 400° F. to 650° F. is considered to be representative of such baking and/or curing operations, and for example, a temperature of approximately 500° F. might be used for a nylon coating. Initially the induction heating at the station 40 will begin the actual fusing, and the subsequent heating determines the precise melt-flow performance. Of course, the amount of heat absorbed by a continuously moving tube is a function of both time and temperature, and there are many variables, e.g., thickness, color and chemical composition, which influence the baking conditions of the polymeric material.

When a thermosetting polymeric coating is being applied, in addition to the heating which leads up to and achieves the desired melt-flow of coated powder, a final curing is effected after the coating material has been uniformly distributed over the tubing. This curing step, which is the chemical crosslinking of the thermosetting material, is the final stage of the baking operation, and reference is made to earlier mentioned U.S. Pat. No. 3,667,095 with respect to coating with thermosetting resins.

Subsequent to baking, a cooling station 42, preferably utilizing a water quench, is employed to quickly lower the temperature of the polymeric exterior coating to a level that it will not be adversely affected by contact with the take-off assist device 44 (fully described in commonly-assigned U.S. Pat. No. 3,965,551), which is located immediately thereafter. In addition, the water quench is employed to assure that the heat-history of the coated polymer does not exceed a desired amount, such that degradation or decoloration of the polymeric material might result. An ancillary roller support for the continuously moving tubing could be provided at a location in the water quench station 42 where the temperature of the polymer will have fallen below a suitable level where such contact may occur without detriment to the surface. However, inasmuch as this point would be of necessity quite close to take-off assist device 44, such additional support might be considered to be unnecessary. A traveling shear 46 is preferably employed to sever the tubing to desired lengths. A tube straightening station 45 is preferably employed between the cooling station 42 and the shear 46.

Referring now to FIGS. 2–5, the powder coating station 36 includes a booth 48 defining a spray chamber 50. The booth has a front wall 52 having a central opening 54 which is covered by a hinged door, not shown, an upstream sidewall 56 having a tubing inlet opening 58, and a downstream sidewall 60 having a tubing exit opening 62. Positioned behind the booth 48 is a collector 64 having a feed chute 66 for adding pre-mixed (nylon and metallic pigments) thermoplastic particles to the system and a hopper 68 for supplying fluidized metallic nylon powder to the spray nozzles 72 extending into the chamber from a movable stand 74 to create a cloud or fluidized bed of particulate material that will adhere to the surface of the preheated tubing as its passes through the chamber. The collector 64 functions to draw the oversprayed powder from the booth 48 and separate powder particles from the air/powder stream.

Figure 4:
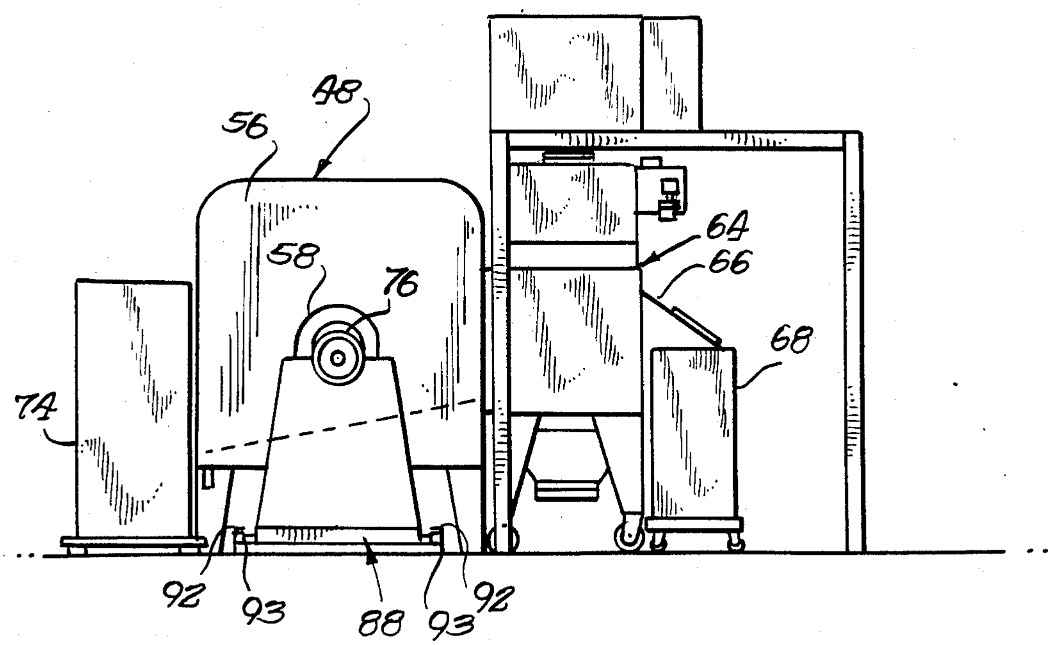
FIG. 4 is a side elevational view of the powder coating station.
Figure 5:
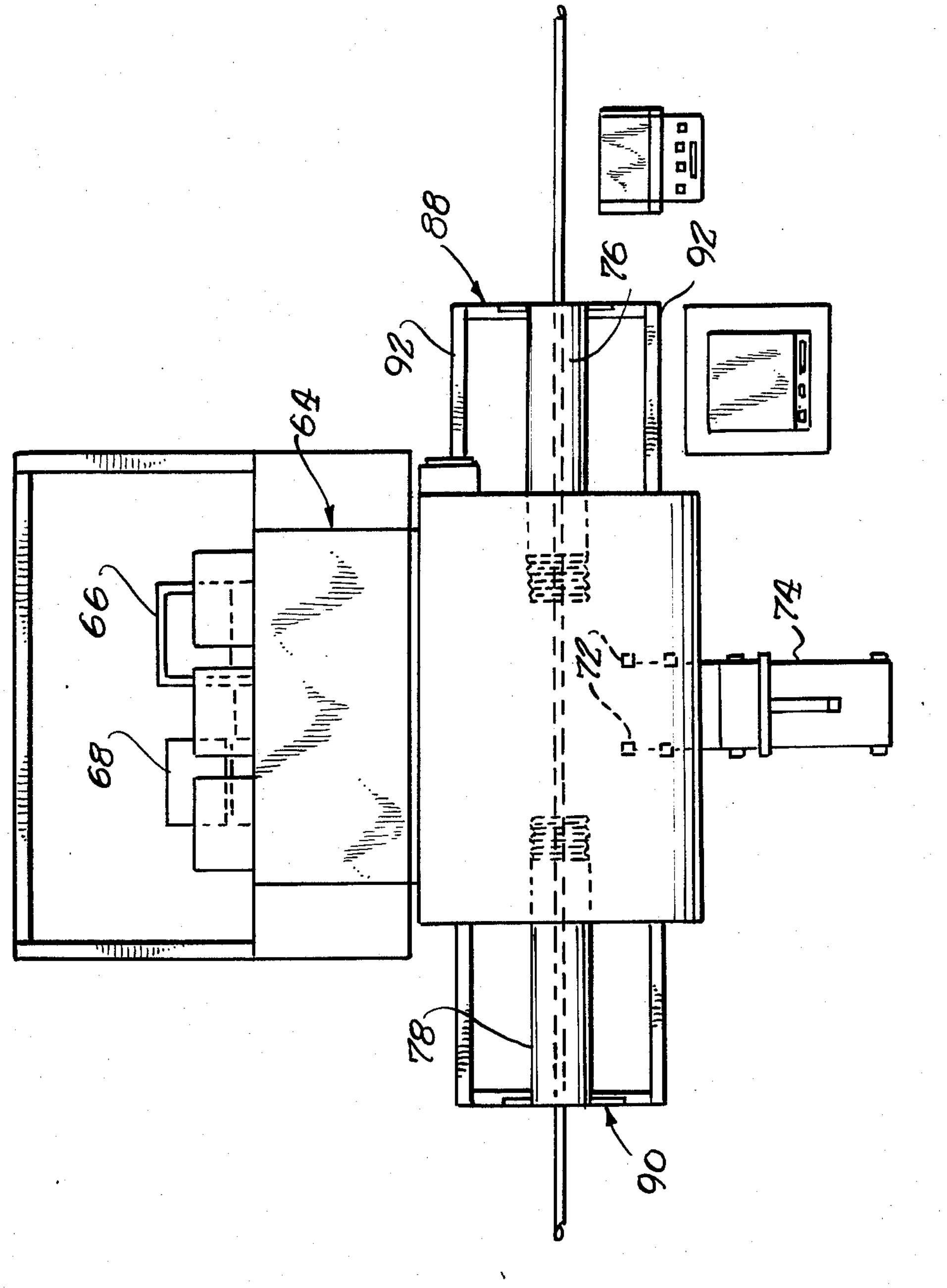
FIG. 5 is a plan view of the powder coating station.

The powder coating station 36 also includes isolation means for isolating the path of the tubing from the remainder of the chamber 50. Included in the isolation means are an upstream pipe or conduit 76 and a downstream pipe or conduit 78 which together create an isolation passageway through which the tubing passes without contact. The upstream pipe 76 has a first end 80 and a second end 82 extending inside the chamber 50 through the tubing inlet opening 58. Similarly, the downstream pipe 78 has a first end 84 and a second end 86 extending inside the chamber through the tubing exit opening 62. Each pipe 76, 78 is supported for reciprocal movement on a wheeled carriage or truck 88, 90, respectively. The trucks are guided by a pair of spaced U-shaped rails 92 laid in the direction of travel of the tubing. More specifically, as shown in FIG. 4, the wheels 93 of the trucks ride on the lower flanges of the rails with the upper flanges of the rails overlying the wheels to prevent the trucks from jumping from the rails.

As the trucks are identical, only one truck need be described in detail. The truck 88 has a horizontal box frame made up of end beams 94 and side beams 96 welded together with a wheel rotatably held at each corner of the frame. The truck 88 also includes a vertically extending end plate 98 including an arcuate cutout at its upper end for seating the first end 80 of the upstream pipe 78, with the end plate being welded to both the pipe 78 and the end beam 94 so that the pipe is inclined (about 2 degrees from horizontal) with the second end 82 of the pipe being elevated relative to the first end 80. A vertical beam 100, welded to the pipe end and end beam and extending at right angles to the plate 98, may be provided to better support the cantilever pipe 76. A fillet 102 can also be provided for additional support.

Figure 2:
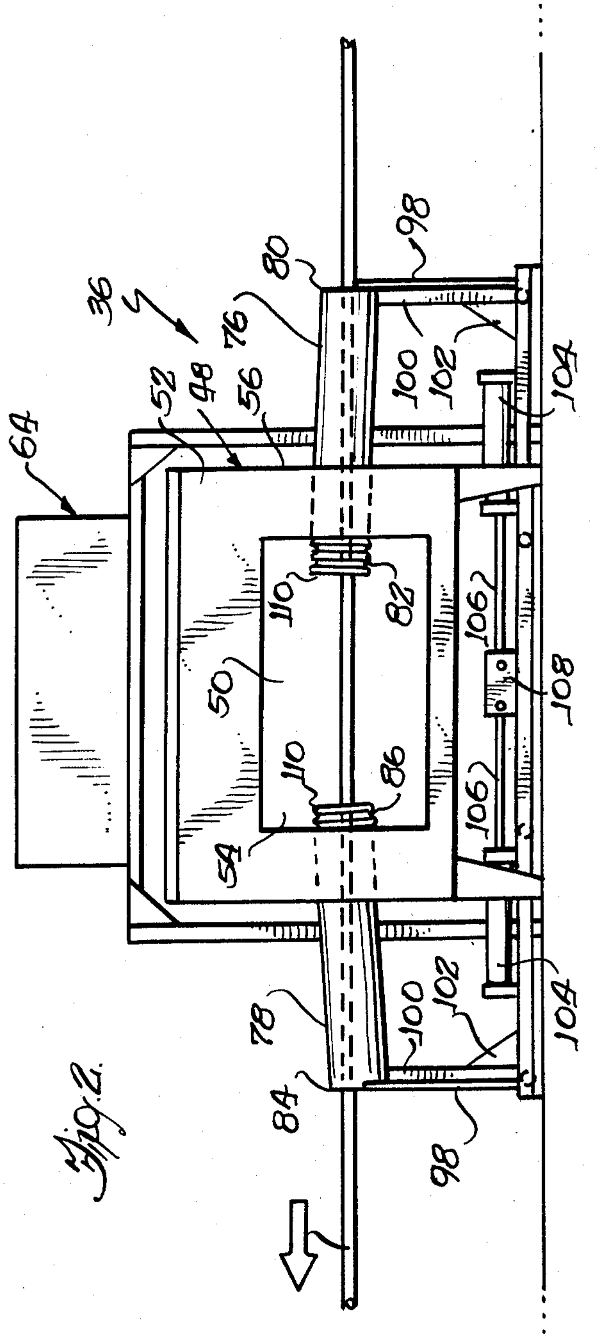
FIG. 2 is a front elevational view of the powder coating station, with certain components removed, illustrating the isolation means comprising a pair of pipes through which the tubing passes without contact, with the pipes spaced to permit coating of the tubing.
Figure 3:
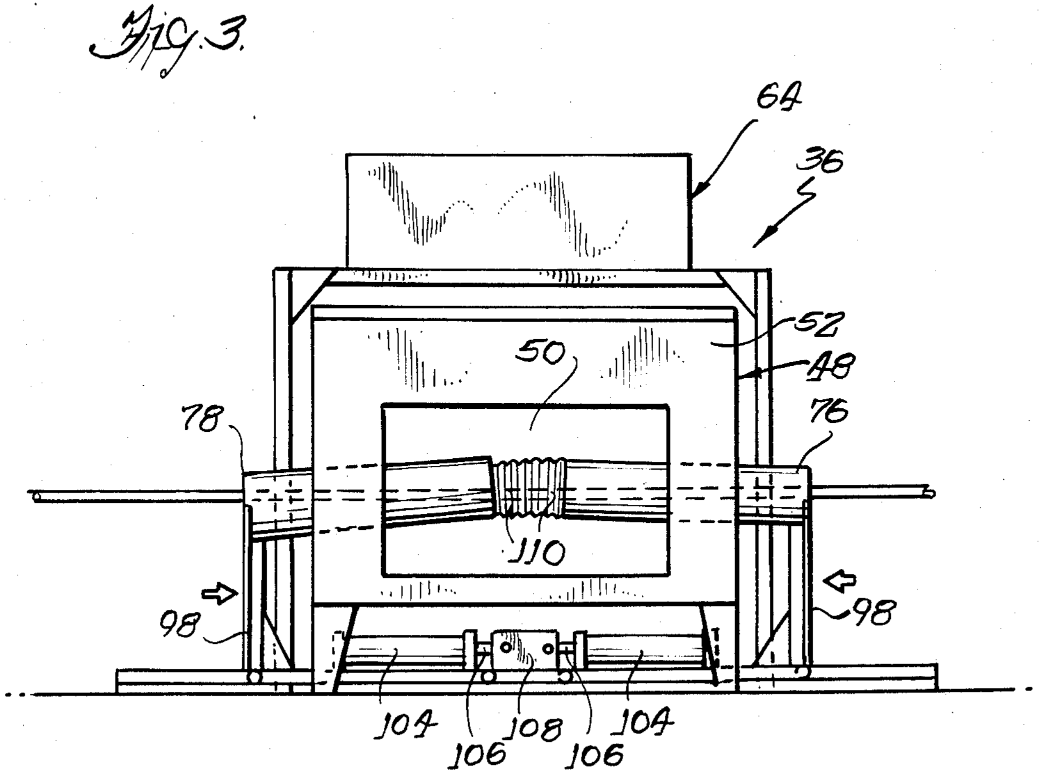
FIG. 3, similar to FIG. 2, shows the pipes in their closed positions isolating the tubing from the fluidized bed chamber.

Mounted on the frame of the truck 88 is an air cylinder 104 having a rod 106, the distal end of which is connected to a standard 108 immovably mounted between the trucks. The truck 90 also carries an air cylinder 104 having an extendable rod 106 connected to the standard 108. Each pipe second end carries sealing means in the form of a cylindrical bellows 110 made of resilient material. As shown in FIG. 2, when the rods of the cylinders 104 are extended, the pipes 76, 78 are spaced apart and generally reside outside the chamber 50 so as not to interfere with the coating of the tubing in the chamber 50 during normal operation. Upon activating the cylinders to retract their rods, the trucks roll toward each other causing the pipes to come together with the two bellows compressing against each other thereby isolating the tubing path from the chamber, as shown in FIG. 3. The tube mill production line further preferably includes sensors for detecting a significant malfunction at one of the stations and, in response, activating the isolation means to prevent any liquid carried by the tubing from one of the upstream stations from potentially contaminating the particles and flakes in the fluidized bed chamber. Furthermore, the pipes can seal the tubing from the chamber during start-up of the tube mill after the malfunction is corrected. The isolation means can also be operated manually.

Thus the trucks 88 and 90, the rails 92, the air cylinders 104 and the standard 108 constitute means for reciprocating the pipes 76 and 78 between a first position, shown in FIG. 2, where their second ends are spaced and they do not interfere with the coating of the tubing as it passes through the chamber 50, and a second position, shown in FIG. 3, wherein the pipes abut together with their second ends sealed by the bellows 110 to isolate the tubing path from the chamber. As in all the positions of the pipes the pipe first ends 80 and 84 are disposed outside of the chamber 50, any liquid dripping from the tubing into the pipes will be directed outside of the chamber.

The powder coating station 36, including the chamber 50, provides a coating to the tubing which is a mixture of the thermoplastic particles and the flakes of metallic material or of pearlescent material. This decorative coating can be very thin because the chamber provides a uniform coating to the exterior of the tubing. It will be appreciated that besides galvanized tubing the powder coating can also be used on raw steel tubing. In this case, the metal treating station 26 is converted to an alkaline cleaning station. Particularly where the tubing is to be used inside for decorative purposes, the galvanization step may not be necessary as the tubing is protected from the elements.

As a method of making endless blanks of specialty coated metal tubing, the present invention includes several steps:

(a) The metal strip is formed into tubing as the strip moves along a straight-line longitudinal path.

(b) The lateral edges of the moving strip are continuously welded to complete the tubing.

(c) The exterior surface of the moving tubing is cleaned and the cleaned exterior surface is dried therein.

(d) The cleaned and dried tubing is heated to a temperature of at least 120° F.

(e) The heated tubing is passed through a powder coating region and a layer of thermoplastic material having flakes disposed there throughout is applied to the exterior of the tubing, the layer uniformly surrounding the circumference of the tubing and having a thickness of about at least two mils, this coating region containing a spray comprising a mixture of thermoplastic particles of a size between about 10 microns and about 80 microns and flakes of metallic material or of pearlescent material. The flakes constitute between about 5 and 10 weight percent of the particulate material constituting the spray. The coated tubing is further heated to assure a smooth exterior surface. The method of the present invention includes a further step wherein the chamber is automatically isolated from the tubing in the case of the occurrence of a malfunction within one or more of the forming, welding, cleaning and heating steps which causes a halt in the travel of the tubing.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A method for making endless lengths of specialty coated metal tubing, which method comprises:

forming metal strip into tubing as such strip moves along a straight-line longitudinal path;

continuously welding adjacent lateral edges of said moving strip to complete the tubing;

cleaning the exterior surface of said moving tubing and drying said cleaned exterior surface, heating said cleaned and dried tubing to a temperature of at least about 120° F., passing said heated tubing through a powder coating region and applying a layer of thermoplastic material having flakes dispersed there throughout, said layer uniformly surrounding the circumference of said tubing and having a thickness of at least about 2 mils, said coating region containing a particulate fluidized bed comprising a mixture of thermoplastic particles of a size between about 10 microns and about 80 microns and flakes of metallic material or of pearlescent material, said flakes constituting between about 5 and 10 weight per cent of the particulate material constituting said fluidized bed;

automatically isolating said fluidized bed region from said longitudinal path of said tubing in the case of occurrence of a malfunction within one or more of said forming, welding, cleaning and heating steps which causes a halt in the travel of said tubing; and further heating said coated tubing to assure a smooth exterior surface.

2. An in-line, continuous, roll-forming tube mill production line comrising:

a supply station for continuously supplying steel strips;

means for continuously moving said strip along a straight-line longitudinal path;

a roll-forming station for forming said moving strip into a tubular configuration;

a welding station for joining by welding the edges of said moving strip;

at least one station for performing at least one of the following processes which call for application of a liquid to the exterior of the moving tubing: cleaning the exterior of the moving tubing by washing and/or pickling, rinsing the exterior of the moving tubing, and applying a liquid coating to exterior of the moving tubing;

a preheating station for preheating of the moving tubing by induction;

a powder coating station for applying a plastic coating to the exterior of said moving tubing, said powder coating station comprising a coating chamber and means for selectively isolating the longitudinal path of the moving tubing from said chamber in the case of a malfunction at one or more of said stations which causes a halt in the travel of said tubing; and a heating station for baking and/or curing of the powder coating.

3. A tube mill production line as set forth in claim 2 wherein said means for isolation comprises at least one pipe through which said tubing passes, and means for reciprocating said pipe between a first position wherein said pipe is disposed substantially outside said chamber and does not interfere with application of said plastic coating to said tubing and a second position wherein said pipe is disposed substantially inside said chamber to at least partially isolate said tubing from said chamber.

4. A tube mill production line as set forth in claim 3 wherein said pipe has a first end and a second end, said pipe being inclined relative to the path followed by said tubing through said chamber with said first end being disposed lower than said second end.

5. A tube mill production line as set forth in claim 4 wherein said means for reciprocating is connected to said first pipe end, said first pipe end being disposed outside said chamber in all positions of said pipe whereby fluid entering said pipe runs outside said chamber.

6. A tube mill production line as set forth in claim 4 wherein said second pipe end carries resilient sealings means for entering into sealing relationship with another component of said means for isolation.

7. A tube mill production line as set forth in claim 2 wherein said means for isolation comprises a pair of pipes through which said tubing passes, said pipes having first ends disposed outside said chamber and second ends disposed inside said chamber, said means for isolation further comprising means for selectively relatively moving said pipes to effect isolation of said tubing from said isolation chamber.

8. A tube mill production line as set forth in claim 7 wherein said pipes are inclined with their second ends elevated with respect to their first ends so that liquid dripping from said tubing into said pipes is directed outside said chamber.

9. A tube mill production line as set forth in claim 8 wherein at least one of said pipe second end carries a reilient sealing bellows.

10. A tube mill production line as set forth in claim 2 wherein said means for isolation comprises a pipe through which said tubing passes, support structure for said pipe disposed outside said chamber, a track on which said structure rides and means for moving said support structure on said track so that said pipe extends inside said chamber to isolate said tubing from said chamber.

11. A tube mill production line as set forth in any of claims 3–10 comprising a control means including at least one detector for sensing a malfunction at one of said stations to cause isolation of said tubing from said chamber.

* * * * *

UNITED STATES PATENT AND TRADEMARK OFFICE
CERTIFICATE OF CORRECTION

PATENT NO. : 4,621,399

DATED : November 11, 1986

INVENTOR(S) : Qureshi et al.

It is certified that error appears in the above-identified patent and that said Letters Patent is hereby corrected as shown below:

Column 3, line 14, correct spelling of --supply--.

Column 8, line 28, correct spelling of --comprising--.

Claim 10. Column 10, line 5, change "end" to --ends--.

Signed and Sealed this

Twenty-first Day of April, 1987

*Attest:*

DONALD J. QUIGG

*Attesting Officer*

*Commissioner of Patents and Trademarks*